(12) United States Patent
Collins

(10) Patent No.: US 7,745,379 B2
(45) Date of Patent: Jun. 29, 2010

(54) METHOD OF INSULATING A SUBSEA STRUCTURE

(75) Inventor: Patrick Joseph Collins, Ellon (GB)

(73) Assignee: Aubin Limited (GB)

( * ) Notice: Subject to any disclaimer, the term of this patent is extended or adjusted under 35 U.S.C. 154(b) by 1211 days.

(21) Appl. No.: 10/559,712

(22) PCT Filed: Jun. 3, 2004

(86) PCT No.: PCT/GB2004/002349

§ 371 (c)(1),
(2), (4) Date: Dec. 5, 2005

(87) PCT Pub. No.: WO2004/109057

PCT Pub. Date: Dec. 16, 2004

(65) Prior Publication Data

US 2006/0147273 A1    Jul. 6, 2006

(30) Foreign Application Priority Data

Jun. 4, 2003    (GB) .................................. 0312781.8

(51) Int. Cl.
*E02D 27/38* (2006.01)
*E02D 5/60* (2006.01)

(52) U.S. Cl. ........................ 507/128; 507/102; 507/129; 507/136; 507/137; 507/139; 507/202; 507/230; 507/231; 507/235; 507/242; 507/260; 507/261; 507/263; 507/266; 405/210; 405/211.1; 166/275; 166/302; 166/356

(58) Field of Classification Search ....................... None
See application file for complete search history.

(56) References Cited

U.S. PATENT DOCUMENTS

| 3,749,173 | A | * | 7/1973 | Hill et al. ..................... 166/291 |
| 3,757,864 | A | * | 9/1973 | Crawford et al. ......... 166/308.4 |
| 3,990,978 | A | * | 11/1976 | Hill ............................ 507/235 |
| 5,290,768 | A | * | 3/1994 | Ramsay et al. ................. 514/54 |
| 5,417,287 | A |   | 5/1995 | Smith et al. |
| 5,571,315 | A | * | 11/1996 | Smith et al. ................. 106/285 |
| 6,284,809 | B1 |   | 9/2001 | Plummer et al. |
| 6,297,201 | B1 | * | 10/2001 | Geib .......................... 507/244 |

(Continued)

FOREIGN PATENT DOCUMENTS

EP    0336493    10/1989

(Continued)

OTHER PUBLICATIONS

US 6,513,577, 02/2003, Baylot et al. (withdrawn)

*Primary Examiner*—James Seidleck
*Assistant Examiner*—John J Figueroa
(74) *Attorney, Agent, or Firm*—Drinker Biddle & Reath, LLP

(57) ABSTRACT

A method of insulating pipeline bundles used in recovering hydrocarbons from wells is disclosed. A polymeric substance, such as an orthophosphate ester, is injected into the annulus between a carrier pipe and the hydrocarbon conveying tubulars. A ferric salt, such as ferric sulphate, may be added as a gelling agent. The mixture results in a gel having a dynamic viscosity of greater than (1000) PaS. The gel insulates the inner hydrocarbon-conveying tubulars from the surrounding seawater thus helping to maintain the relatively high temperature therewithin. This in turn reduces the likelihood for chemicals, such as hydrates, to be precipitated out of the oil phase.

17 Claims, 4 Drawing Sheets

U.S. PATENT DOCUMENTS

| | | |
|---|---|---|
| 6,933,341 B2 | 8/2005 | Truong Dinh et al. |
| 2004/0092626 A1 | 5/2004 | Chomard et al. |

FOREIGN PATENT DOCUMENTS

| | | |
|---|---|---|
| EP | 0467635 | 1/1992 |
| EP | 0500206 | 8/1992 |
| GB | 2317895 | 4/1998 |
| WO | WO 02/062918 | 8/2002 |

* cited by examiner

METHOD OF INSULATING A SUBSEA STRUCTURE

FIELD OF THE INVENTION

This invention relates to a method of insulating submerged structures, particularly but not exclusively conduits adapted to transfer fluids from subsea hydrocarbon reservoirs to a service platform.

BACKGROUND

A plurality of conduits or pipes of relatively small diameter typically extend from a seabed structure to a service platform and are enclosed within an outer 'carrier' pipe. Such an arrangement is known as a 'pipeline bundle', and is adapted to convey produced fluids from the well.

Additionally having flowed along the pipelines or bundles, hydrocarbons are then transported to the surface for processing via vertical structures which can be either single pipes or a plurality of pipes. Such an arrangement is known as a 'riser' and is adapted to convey fluids from the seabed to the surface for processing and treatment.

When fluids are extracted from subsea reservoirs, their temperature is normally higher than that of the surrounding water. As the fluids cool in the pipes to the temperature of the water, certain compounds come out of solution, and this causes problems with precipitates such as waxes or gas hydrates that build up within the pipelines and can reduce or prevent the flow of hydrocarbons. Moreover, the viscosity of the produced fluids increases as their temperature decreases, which also reduces the rate of flow through the pipeline. Additionally if gas comes out of solution it can, under certain conditions of pressure and temperature, combine with water to form clathrate structures known as 'Hydrates' which can accumulate within the pipeline causing blockages reducing or preventing the flow of hydrocarbons.

It is known to insulate pipeline bundles in several ways to offset these problems—for instance pipes are often insulated using solid syntactic foam preformed insulating coatings. Alternatively the pipe-in-pipe annular spaces are evacuated, or are filled with silica-based materials or hollow spheres of plastic material in a synthetic resin matrix.

These and similar techniques have serious disadvantages in the way of investment cost, difficulty of handling, and the requirement for specialist equipment to manufacture the materials, and as a consequence the materials needed for the techniques are not routinely made up at the point of manufacture of the pipeline. Also some of the materials needed for the insulation are limited with respect to the depth of water in which they can be applied. For example, at depths beyond around 1500 metres the hydrostatic pressure of the water column will collapse foam and its insulating qualities will be lost.

A further attempt to solve this problem is disclosed in European Patent Publication No 0,336,493. In this application, a liquid hydrocarbon gel is provided in the outer pipe to insulate the smaller diameter pipes running therethrough. However, the use of a fluid gel requires the provision of a pressure balancing system which is prone to failure.

Other subsea structures, such as trees provided at a wellhead, can also require insulation.

BRIEF SUMMARY OF THE INVENTION

According to the present invention, there is provided a method of insulating a subsea structure, the method comprising:
  injecting a substance into the subsea structure; allowing said substance to form a gel, wherein the formed gel has a dynamic viscosity of more than 1000 Pa·S.

Preferably the subsea structure comprises a first conduit, more preferably said first conduit enclosing a second conduit.

Preferably, the conduits are tubulars, such as oilfield tubulars.

Preferably, the substance is injected into an annular space between the first and second conduits.

Preferably the thermal properties of the gel can be varied over the length of a conduit or series of conduits. The thermal properties can include density, specific heat capacity, and conductivity of the gel.

Preferably, the gel can retain its integrity unsupported.

In this context, 'retain its integrity unsupported' means a gel that can, for example, be sliced into pieces and can maintain its form when dropped from a height, but cannot be poured or pumped.

Preferably, the substance is a pourable fluid prior to gellation.

Dynamic viscosities of gelled materials discussed in this patent are considerably in excess of 1000 Pa·S, preferably 2000 Pa·S to essentially solid materials which do not flow and thus have a viscosity of over 5,000,000 Pa·S.

Preferably, the substance comprises a fluid which has a comparatively high specific heat capacity and a second fluid which has a comparatively low thermal conductivity.

More preferably, the first fluid is water and the second fluid is a hydrophobic fluid such as a hydrocarbon-containing fluid or a vegetable oil.

The relative proportions of the first and second fluids can be adjusted depending on the nature of the hydrocarbons being recovered, the specific pipeline arrangement and the subsea environment.

Preferably, the substance further comprises a first and second polymeric compound. The first polymeric material may have a general formula

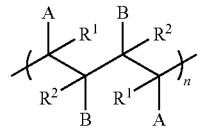

wherein A and B are the same or different wherein at least one comprises a relatively polar atom or group and $R^1$ and $R^2$ independently comprise relatively non-polar atoms or groups.

Preferably, $R^1$ and $R^2$ are hydrogen atoms although they may be other relatively non-polar atoms or groups, for example, alkyl groups.

Preferably, A and B are independently selected from optionally-substituted alkyl, cycloalkyl, cycloalkenyl, cycloalkynyl, aromatic and heteroaromatic groups.

More preferably, A represents a phenyl group substituted, preferably at the 4-position relative to the group C—C, by a formyl group or a group of general formula:

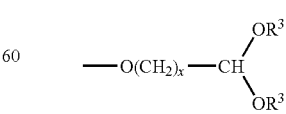

wherein x is an integer from 1 to 6 and each $R^3$ is independently an alkyl or phenyl group or together form an alkalene group.

More preferably, group B represents a group of general formula:

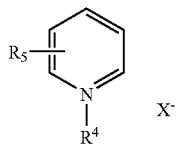

wherein $R^4$ represents a hydrogen atom or an alkyl or aralkyl group, $R^5$ represents a hydrogen atom or an alkyl group and $X^-$ represents a strongly acidic ion.

Other options for the groups A, B and $R^1$-$R^5$ are disclosed in British Patent Publication GB 2,317,895A the disclosure of which is incorporated herein by reference.

Preferably, the second polymeric compound includes one or more functional groups capable of reacting with said first polymeric compound.

More preferably, the second polymeric compound includes a functional group selected from an alcohol, carboxylic acid, carboxylic acid derivative, for example an ester, and an amine group.

Even more preferably, the second polymeric compound is selected from optionally substituted polyvinylalcohol, polyvinylacetate, polyalkalene glycols and collagen (and any component thereof).

Yet more preferably the second polymeric compound is polyvinyl alcohol. Other possible second polymeric compounds are disclosed in the aforementioned British Patent Publication 2,317,895A.

The substance may further comprise acid, such as paratoluene sulphuric acid, to catalyse the reaction between the first and the second polymeric compounds.

In alternative embodiments, the substance may comprise a third polymeric compound and a ferric salt in addition to a hydrocarbon. Such alternative embodiments preferably do not comprise the first and second polymeric compounds nor water. Preferably therefore, the alternative embodiments are effected in a hydrocarbon phase.

Preferably, the third polymeric compound is a phosphate, more preferably an orthophosphate, even more preferably an orthophosphate ester. Preferably, the orthophosphate esters have the structure of formula:

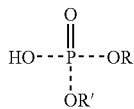

wherein R is a straight or branched chain alkyl or alkaryl group having about 6 to about 18 carbon atoms and R' is hydrogen or an aryl, alkaryl or alkyl group having about up to 18 carbon atoms.

Preferably, about 0.3% to 3 wt % by weight, based on the hydrocarbon/water liquid, of the phosphate is added.

Preferably, the ferric salt and third polymeric compound are added in an equimolar ratio. More preferably, the alternate embodiment forms a gel as described in U.S. Pat. No. 5,417,287, the disclosure of which is incorporated herein by reference.

Preferably, materials which undergo a change in phase (such as going from liquid to solid) on cooling are selected, as these release heat thereby extending the time it takes for the tubular contents to cool down.

Optionally, cenospheres may be added to the substance in order to reduce thermal conductivity, improve mechanical strength and lower density.

Optionally, spheres made of polymers and enclosing hydrocarbon gas can be added to provide reduced thermal conductivity and lower density.

Optionally waxes can be added to the hydrocarbon.

Preferably the waxes are highly branched chain waxes.

Optionally some or all of the gelling components can be incorporated within a wax of a known melting point to either slow the rate of gel formation or arrest it until the wax melts on the commencement of production.

Optionally, antibacterial agents and/or corrosion inhibitors can be added to the substance.

Optionally chemicals that scavenge free radical materials can be added to the substance.

According to a second aspect of the present invention, there is provided a method of insulating a submerged conduit, the method comprising the steps of:
   applying at least one substance to the conduit before it is submerged; then,
   submerging the conduit under water; and
   allowing the substance to form a gel.

Preferably the method employs the methods set out above.

Preferably, the tubular comprises further tubulars enclosed therein.

Optionally the external tubular is manufactured out of thin wall steel or a plastic, for example high density polyethylene, such that the hydrostatic pressure occasioned from the depth of water in which the pipeline is immersed is transferred from the outer pipe to the inner pipe with the gel acting as a pressure transfer medium.

Preferably, the substance is applied to an annulus between the tubular and the said further tubulars enclosed therein.

According to a further aspect of the invention there is provided a method of altering the buoyancy of a subsea structure, the method comprising,
   injecting a substance into the subsea structure; allowing said substance to form a gel, wherein the formed gel has a dynamic viscosity of more than 1000 Pa·S.

Preferably the buoyancy is altered by the addition of microspheres in the substance which reduces the density of the gel.

According to a further aspect of the invention there is provided a method of insulating a structure, the method comprising:
   injecting a substance into the structure;
   allowing said substance to form a gel.

BRIEF DESCRIPTION OF THE DRAWINGS

Embodiments of the present invention will now be described by way of example only with reference to the accompanying figures, in which.

DETAILED DESCRIPTION OF THE DRAWINGS

Figure 1:
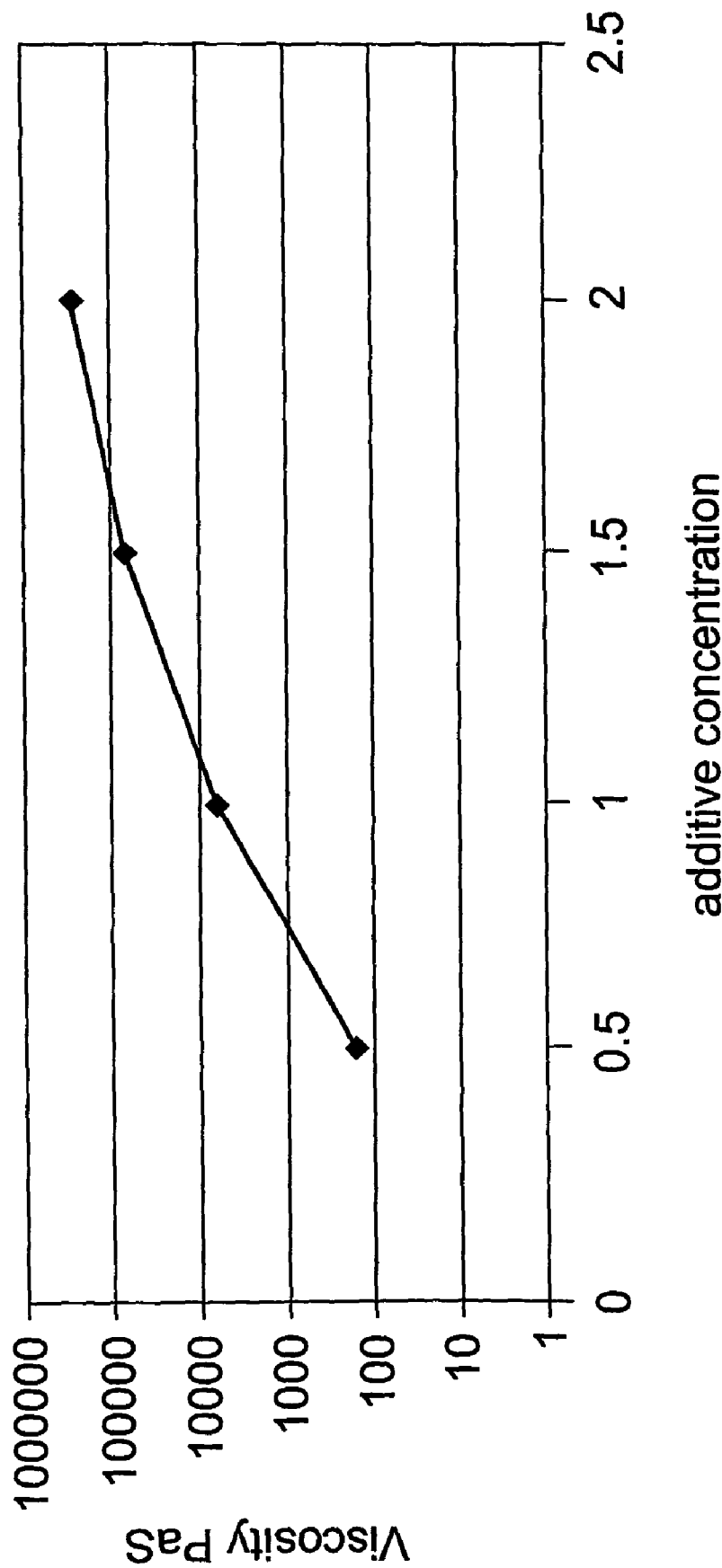
FIG. 1 is a graph showing the viscosity of a gel as a function of the amount of gellant added.

Examples 1-4, 7 use an "all-oil" system, and were made up according to a method described in U.S. Pat. No. 5,417,287 the disclosure of which is incorporated herein by reference.

Example 1

2.0 ml of Clearwater HGA 70 (an orthophosphate ester) was added (although between 0.3 and 3.0% by weight is suitable) to a beaker containing 150 ml of DF 1 base oil from Atofina Ltd. To this mixture 2.0 ml of Clearwater HGA 55S (a ferric salt) was added dropwise into the stirred solution. The fluid was left to gel for a period of 24 hours. In practice however a gel formed typically between 2-5 minutes from adding the ferric source.

Some of the properties of this gel are set out in table 1.

Example 2

7.5 g of glass microspheres were added stirred into a container holding 150 ml of base oil DF 1 from Atofina Ltd.

Microspheres (also called Cenospheres) are small glass hollow spheres of between 20-150 microns such as can be extracted from volcanic ash or the ash from coal-fired power stations. The addition of cenospheres reduces thermal conductivity and improves mechanical strength of the resulting gel. However they are not essential to the invention.

To this mixture 1.5 ml Clearwater HGA 70 (an orthophosphate ester) was added (although between 0.3 and 3.0% by weight is suitable). The mixture was gelled by the addition of 1.5 ml of Clearwater HGA 55S (a ferric salt). Alternatively ferric sulphate may be added at between 0.25 to 2.0 moles per mole of phosphate ester. The fluid was left to gel for a period of 24 hours. In practice however a gel formed typically between 2-5 minutes from adding the ferric source.

Some of the properties of this gel are set out in table 1.

Example 3

A third gelled fluid insulating system containing 450 ml of base oil DF1, 90 g of wax Astorwax F07745/B, Clearwater HGA 55S 4.5 ml and Clearwater HGA 70 4.5 ml was similarly made up, following the method of example 1.

After a period of time, typically between one and twenty four hours, the mixture sets as a solid jelly-like material. When this gel was heated to 80 C the wax dissolved but the gel characteristics were retained. On cooling wax was found to be fully dispersed.

Some properties of this gel are also set out in table 1, below.

Example 4

A fourth gelled fluid was made. 40 g of microspheres (glass bubbles k 37 from 3M Corporation) were placed in a beaker with 20 ml of Atofina base oil DF1. 0.2 ml Clearwater HGA 70 was stirred into the solution. Ten ml of Atofina base oil DF1 containing 0.2 ml Clearwater HGA 55S was then added dropwise into the solution.

Some properties of this gel are also set out in table 1, below.

In general the relative proportions of components in the gelled fluid insulating medium were determined using considerations of cost, ease of shipping to manufacturing location and desired performance characteristics.

Of particular interest is a measure of the rate of cool down known as diffusivity, this is described as:

$$\text{Diffusivity} = \text{Conductivity (W/mK)} / [\text{Specific heat capacity (J/kg/K)} \times \text{Density kg/m}^3]$$

The diffusivity measurements are given in table 1 below.

TABLE 1

| | Quantities of Components | | | | | | | |
|---|---|---|---|---|---|---|---|---|
| Gel | DF 1 Base Oil (ml)[1] | Wax g | Other ml | Microspheres g | Conductivity[3] W/mK | Specific Heat[2] J/kgK | Density[4] kg/m$^3$ | Diffusivity m$^2$/s × 10$^{-8}$ |
| 1 | 150 | 0 | 2.0 ml C'HGA 70 (phosphate ester) 2.0 ml C'HGA 55S (ferric salt) | 0 | 0.131 | 2310 | 790 | 7.178 |
| 2 | 150[1] | 0 | 1.5 ml C'HGA 70 (phosphate ester) 1.5 ml C'HGA 55S (ferric salt) | 7.5 | 0.1106 | 1980 | 728 | 7.673 |
| 3 | 450 | 90 | 4.5 ml C'HGA 70 (phosphate ester) 4.5 ml C'HGA 55S (ferric salt) | 0 | 0.1469 | 2524 | 820 | 7.098 |
| 4 | 20 | 0 | 0.2 ml C'HGA 70 (phosphate ester) 0.2 ml C'HGA 55S (ferric salt) | 40 | 0.0723 | nd | 470 | nd |

Notes:
[1]paraffinic oil base oil DF1.
[2]determined by differential Calorimetry ASTM method C351.
[3]Conductivity was measured using a non steady state probe ASTM method D 5930-01
[4]Determined by calculation
Abbreviations
C'HGA 70—Clearwater HGA 70 (phosphate ester)
C'HGA 55S—Clearwater HGA 55S (ferric salt)

Further examples have been carried out to test the effectiveness of such a gelled fluid insulating system as an insulator for a pipeline bundle.

Example 5

British Patent publication GB 2,317,895A discloses a substance and a method of forming a gel, the disclosure of which is incorporated herein by reference. Examples 5, 6 and 8 are based on the chemistry disclosed in GB 2,317,895A.

45 g of oil (for example sunflower or vegetable oil) were placed in a container to which 35 g of cenospheres were added and the mixture was stirred for five minutes until the cenospheres were fully dispersed.

In a separate beaker a mixture of 18 g of water and 2 g of polyvinylalcohol (PVA) was made up and the mixture of sunflower oil and cenospheres was poured into this and mixed together to form an emulsion mixture of oil, water, PVA and cenospheres.

An aqueous solution of 4-(4-formylphenylethenyl)-1-methylpyridinium methosulphonate (SbQ) was added to the mixture as a cross-linking agent. The resulting mixture was then stirred and the contents of the beaker were decanted into a 100 ml measuring cylinder. An acid was then added to catalyse the change of phase of the mixture from liquid to gel. An inorganic or organic acid may be used, examples being hydrochloric acid, sulphuric acid, acetic acid, and formic acid. The greater the quantity of acid which is used, the quicker the rate of formation of the gel. Thus the rate of formation of the gel can be controlled by varying the amount of acid used. The mixture was allowed to stand for a period of twelve hours after which time a reaction had occurred and a gel had formed.

An aldol condensation reaction between polymer chains is effected to form the gel, that is a reaction between the polyvinylalcohol and the SbQ according to the reaction scheme below:

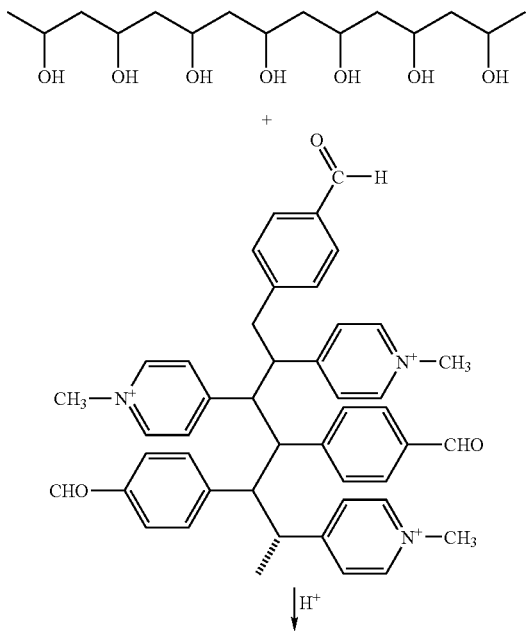

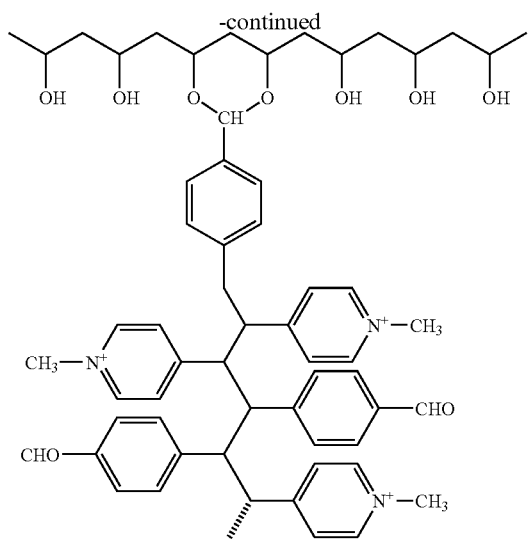

A determination of this material's thermal conductivity was carried out using a Huskaflux non-steady-state probe. The density was measured and the specific heat capacity was calculated from existing known values for each constituent in order to determine the thermal diffusivity of the gelled system.

Table 2 below details the thermal performance of example 5.

Example 6

A second gelled fluid insulating system containing 76.5 g of water, 8.5 g of polyvinyl alcohol, 10 g of sunflower oil and 5 g of cenospheres was similarly made up, following the method of example 1.

0.5 g of SbQ and 1 g of acid (HCl 10%) was then added.

After a period of time, typically between one and twenty four hours, the mixture sets as a solid jelly-like material by undergoing the equivalent, aldol condensation reaction detailed above.

Some properties of this gel are set out in table 2, below.

Example 7

A third all oil system was prepared. 16 g of cenospheres were stirred into a container holding 84 g of kerosene. To this mixture 1 g Clearwater HGA 70 (an orthophosphate ester) was added (although between 0.3 and 1.5% by weight is suitable). The mixture was gelled by the addition of 1 g of Clearwater HGA 55S (a ferric salt). Alternatively ferric sulphate may be added at between 0.25 to 2.0 moles per mole of phosphate ester. The fluid was left to gel for a period of 24 hours. In practice however a gel formed typically between 2-5 minutes from adding the ferric source.

Some of the properties of this gel are set out in table 2 below which also shows a range of gelled fluid insulating systems with different mixes of oil, water and cenospheres.

Example 8

A fourth gelled fluid insulating system containing 10 g of water, 1 g of polyvinyl alcohol, 45 g of sunflower oil and 45 g of cenospheres was similarly made up, following the method of example 1.

0.05 g of SbQ and 1 g of acid (HCl 10%) was then added.

After a period of time, typically between one and twenty four hours, the mixture sets as a solid jelly-like material by undergoing the equivalent aldol condensation reaction detailed above.

Some properties of this gel are also set out in table 2, below.

In general the relative proportions of components in the gelled fluid insulating medium were determined using considerations of cost, ease of shipping to manufacturing location and desired performance characteristics.

Of particular interest is a measure of the rate of cool down known as diffusivity, this is described as:

Diffusivity=Conductivity (W/mK)/[Specific heat capacity (J/kg/K)×Density kg/m3]

The diffusivity measurements are given in table 2 below.

gelled fluid insulating media in pipe-in-pipe systems is therefore that the external carrier pipe does not need to be rated to hydrostatic pressure experienced at depth since the gelled fluid insulating media transfers the hydrostatic pressure onto the inner tubulars.

A further consequence of certain embodiments of the invention transmitting pressure is that they maintain their integrity and insulating properties unlike some prior art systems which can collapse and lose their insulating properties at higher pressure. Thus embodiments of the present invention do not suffer the same depth limitations as syntactic foams (although they will deform and recover at higher stress).

The formation of a gel acts to prevent loss of heat through convection. An advantage of certain embodiments of the

TABLE 2

| Gel | Ratio of Components | | | | Conductivity[3] | Specific Heat[2] | Density[2] | Diffusivity $m^2/s$ |
| --- | --- | --- | --- | --- | --- | --- | --- | --- |
| | Oil[1] | Water | Other | Cenospheres | W/mK | J/kgK | kg/m³ | ($\times 10^{-6}$) |
| 5 | 45 | 18 | 2 PVA + 0.125 SbQ + 1 acid | 35 | 0.22 | 1870 | 908 | 0.130 |
| 6 | 10 | 76.5 | 8.5 PVA + 0.5 SbQ + 1 acid | 5 | 0.44 | 3790 | 982 | 0.118 |
| 7 | 84[4] | 0 | 1 C'HGA 70 (phosphate ester) 1 C'HGA 55S (ferric salt) | 16 | 0.14 | 1740 | 863 | 0.093 |
| 8 | 45 | 10 | 1 PVA + 0.05 SbQ + 1 acid | 45 | 0.17 | 1480 | 901 | 0.127 |

Notes:
[1]Samples based on sunflower oil.
[2]Estimated from available data for constituents.
[3]Conductivity was measured using a non steady state probe, ASTM method D5930-01
[4]Oil based gel using paraffinic oil.
Abbreviations
PVA—Polyvinylalcohol
SbQ—4-(4-formylphenylethenyl)-1-methylphyridinium methosulphonate
OPE—Orthophosphate ester
C'HGA 70—Clearwater HGA 70 (phosphate ester)
C'HGA 55S—Clearwater HGA 55S (ferric salt)

The gelled fluid insulating media thermal conductivities and diffusivities (a measure of the rate of cool down) are comparable to those of existing syntactic materials, which can go down to 0.12 W\mK and 0.12×10⁻⁶ m²\s respectively. While low conductivity is required to provide the steady state thermal performance on the flowing system, low diffusivity is also desirable to maintain long cool-down times.

In use, the pipeline bundles are made up on the surface as is conventional in the art and an oil/water/additive mixtures for example, those detailed in examples 1-4 above, are then added to the pipe-in-pipe annular space between the inner pipes and the carrier pipe. The bundles are then installed in the conventional manner.

The mixture has a sufficiently low viscosity to enable it to be pumped into the pipe-in-pipe bundle annular space where a reaction can take place which results in the mixture forming into a gel as defined in the Larousse Dictionary of Science and Technology 1995 page 470, that is a substance with properties intermediate between the liquid and the solid states.

The resulting gelled material is a jelly-like substance and so can transmit the hydrostatic pressure upon the external tubular or 'carrier' to the inner tubulars. A further benefit of certain embodiments of the present invention in using such present invention is that the gel possesses low conductivity, thereby providing suitable insulating properties for deep water applications.

Viscosity

An important advantage of certain embodiments of the present invention is that the gelling material may be poured into the annulus of the pipeline bundle during set up but, once set into a gel, is of "jelly-like" viscosity such that it cannot be poured. This obviates the need for pressure-balancing systems in particularly preferred embodiments of the invention and also enables the gel to transfer the hydrostatic pressure from the sea to the inner pipelines in certain embodiments of the invention. The outer pipelines can therefore be made from cheaper, less robust, materials such as thin steel or plastic.

The viscosity of various embodiments of the present invention were determined as a function of gellant addition using a dropped ball method based on a modification of ASTM D1343-96 (2000). Viscosity was determined by measuring the rate at which a stainless steel ball falls a predetermined distance and applying this figure to a Stokes law calculation.

Experimental Procedure

A stainless steel ball of diameter 12 mm was weighed and its density determined. A number of all-oil gel formulations (equivalent to examples 1-4, 7 above) in accordance with the present invention were prepared over a range of additive concentrations and placed into calibrated vessels. Gelling chemicals were simply added to Atofina base oil DF1 although any hydrocarbon could be used. The gels were left to stand for a period of five days to ensure that the gel had reached maximum strength. The stainless steel ball was placed carefully on the surface of the gel in the middle of the vessel. The ball's rate of fall through the gel was determined by measuring either the time it took the base of the ball to pass between two calibrated points or the time it took for the ball to pass from the base to the top of the ball at one calibrated point. A number of readings were taken and the average used to calculate the viscosity using stokes equation as follows:

$$V=(2gr^2)(d1-d2)/9\mu$$

where $V$=velocity of fall (cm sec$^{-1}$), $g$=acceleration of gravity (cm sec$^{-2}$), 980 cm sec$^{-2}$ $r$="equivalent" radius of particle (cm), $d1$=density of particle (g cm$^{-3}$), $d2$=density of medium (g cm$^{-3}$), and $\mu$=viscosity of medium (dyne sec cm$^{-2}$).

This can be rearranged to give $$\mu=(2gr^2)(d1-d2)/90V \text{ as Pascal seconds (Pa·S)}$$

The Results are displayed in the tables below and in FIG. 1.

| | | |
|---|---|---|
| radius of ball | 0.6 | cm |
| mass of ball | 8.4 | g |
| Volume of ball | 0.904779 | cm$^3$ |
| density of ball | 9.284038 | g/cm$^3$ |
| density of gel | 0.79 | g/cm$^3$ |
| Density diff | 8.494038 | g/cm$^3$ |
| Viscosity coefficient | 66.59326 | |

| Additive concentration percent v/v | | Viscosity | |
|---|---|---|---|
| HGA 55s | HGA 70 | V sec/cm | Pa S |
| 0.5 | 0.5 | 2.26 | 150.5008 |
| 1 | 1 | 89 | 5926.8 |
| 1.5 | 1.5 | 913 | 60799.65 |
| 2 | 2 | 3404 | 226683.5 |

Viscosities in excess of 1000 Pa·S can be achieved with additive concentrations in excess of 0.75 percent.

When this test was repeated using SbQ based oil water gels (as with examples 5, 6 and 8 above) the ball failed to penetrate the gel after a period of 20 hours indicating a viscosity in excess of 5,000,000 Pa·S had been attained.

Determination of Gel Thermal Properties

The thermal properties of the gels disclosed in examples 1-4 and 7, that is the all-oil systems, was studied. The quantities of the phosphate ester/ferric salt etc. utilised do not significantly affect the thermal conductivity and so were not considered in these thermal conductivity experiments. Rather, the thermal conductivity is a function of the base oil, the proportion of microspheres and the presence and concentration any wax.

Thermal Conductivity Measurements

Figure 2:
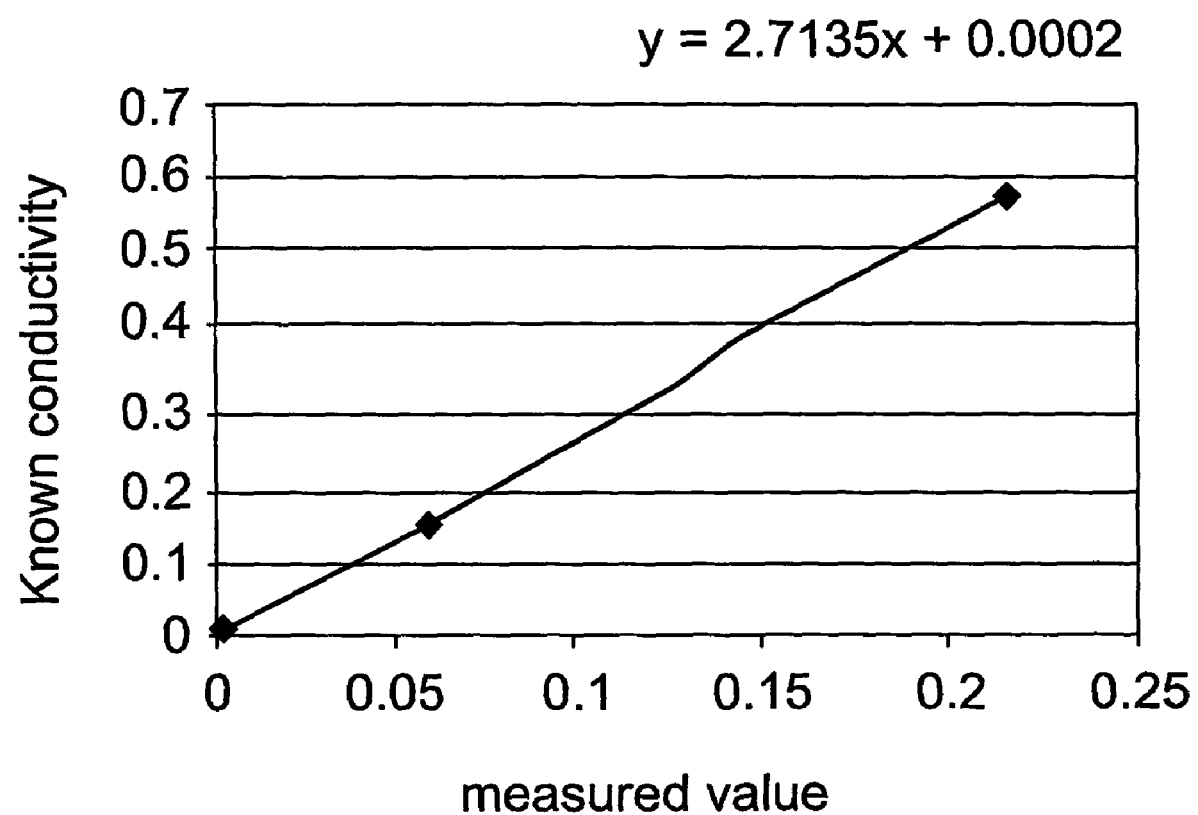
FIG. 2 is a calibration curve of a graph used for determining the thermal properties of certain embodiments of the present invention.

Thermal conductivity measurements were carried out by means of a transient line source technique based on ASTM method D 5930-01 calibrated using water and olive oil materials with known thermal conductivities. The calibration curve is shown in FIG. 2 and produces a formula of $$y=2.7135x+0.0002$$

that is:

$$\text{Conductivity}=2.7135x(\text{Reading})+0.0002$$

Measurements of thermal conductivity for the various gels were then conducted. Conductivities were determined for each measurement. The highest and lowest values measured were discarded and an average was taken.

Results

Sample 1 containing 5 percent microspheres—7.5 g in 150 ml oil gelled

TABLE 3

| Measurement ref | reading | conductivity value |
|---|---|---|
| DG0751 | 0.037861 | 0.108868754 |
| DG0752 | 0.038073 | 0.109502994 |
| DG0753 | 0.044272 | 0.128048542 |
| DG0754 | 0.040853 | 0.11781992 |
| DG0755 | 0.039689 | 0.114337581 |
| DG0756 | 0.03741 | 0.107519497 |
| DG0757 | 0.041316 | 0.119205077 |
| DG0758 | 0.039945 | 0.115103457 |

Average conductivity 0.114 W/m K

Sample 2 containing 20 g microspheres in 60 ml gelled oil

TABLE 4

| Measurement ref | reading | conductivity value |
|---|---|---|
| DG HS 01 | 0.02989 | 0.085021913 |
| DG HS 02 | 0.03172 | 0.090496724 |
| DG HS 03 | 0.032527 | 0.092911026 |
| DG HS 04 | 0.028249 | 0.080112533 |
| DG HS 05 | 0.028462 | 0.080749765 |
| DG HS 06 | 0.028684 | 0.081413923 |

Average conductivity 0.0807 W/m K

Sample 3 contains no microspheres but 30 g wax (Astorwax in 150 ml Oil)

TABLE 5

| Measurement ref | reading | conductivity value |
|---|---|---|
| DG PC 01 | 0.046241 | 0.1339392 |
| DG PC 02 | 0.05535 | 0.161190595 |
| DG PC 03 | 0.050327 | 0.146163286 |
| DG PC 04 | 0.050697 | 0.147270215 |
| DG PC 05 | 0.049223 | 0.142860449 |

Average Conductivity 0.1454 W/m K

Sample 4 10 g microspheres in 150 ml DF1 6.66 percent microspheres

TABLE 6

| Test no | measured | conductivity |
|---|---|---|
| DG 066 24304 1 | 0.034664 | 0.09426076 |
| DG 066 24304 2 | 0.037873 | 0.10296839 |
| DG 066 24304 3 | 0.03969 | 0.10789882 |
| DG 066 24304 4 | 0.039727 | 0.10799921 |
| DG 066 24304 5 | 0.038178 | 0.103796 |
| DG 066 24304 6 | 0.03909 | 0.10627072 |
| DG 066 24304 7 | 0.038178 | 0.103796 |
| | | 0.7269899 |

Average conductivity 0.104 W/m K 7.5 g microspheres in 150 ml 5 percent microspheres

TABLE 7

| Test no | measured | conductivity |
|---|---|---|
| DG 05 24304 1 | 0.041077 | 0.11166244 |
| DG 05 24304 2 | 0.040354 | 0.10970058 |
| DG 05 24304 3 | 0.043796 | 0.11904045 |
| DG 05 24304 4 | 0.038849 | 0.10561676 |
| DG 05 24304 5 | 0.039104 | 0.1063087 |
| DG 05 24304 6 | 0.040868 | 0.11109532 |
| | | 0.66342425 |

Average conductivity 0.111 W/m K

Figure 3:
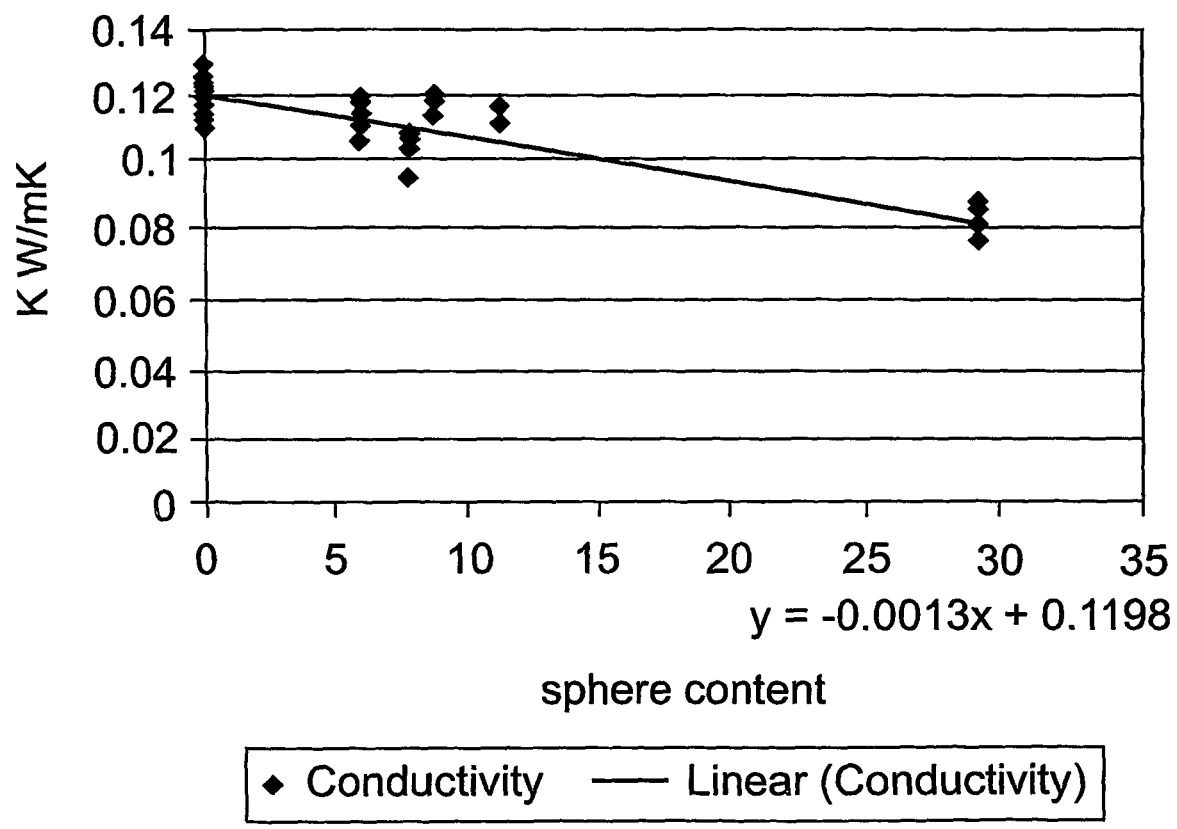
FIG. 3 is a graph showing the conductivity of various embodiments of the present invention as a function of microsphere content; and, FIG. 4 is a graph showing the specific heat capacity of a number of gels in accordance with the present invention.

FIG. 3 plots all of the thermal conductivity measurements as a function of w/w percent sphere content. FIG. 3 shows a poor scatter at low levels of sphere content, however there is a linear relationship with a measurement of 0.12 W/mK. The addition of spheres does not contribute significantly to reducing the thermal conductivity of gel although they do lower the density of the gel and thereby improve its buoyancy. Table 8 details conductivity, specific heat capacity (Cp), density and diffusivity.

TABLE 8

| Sample | Conductivity K | Cp J/ kg K | Density kg/m3 | Diffusivity × $10^{-8}$ m$^2$/s |
|---|---|---|---|---|
| DF 1 gel | 0.12 | 2089 | 790 | 6.575 |
| Gel PC AstorWax | 0.137 | 2524 | 820 | 6.619 |
| Gel 5% spheres | 0.112 | 1881 | 728 | 8.18 |

Figure 4:
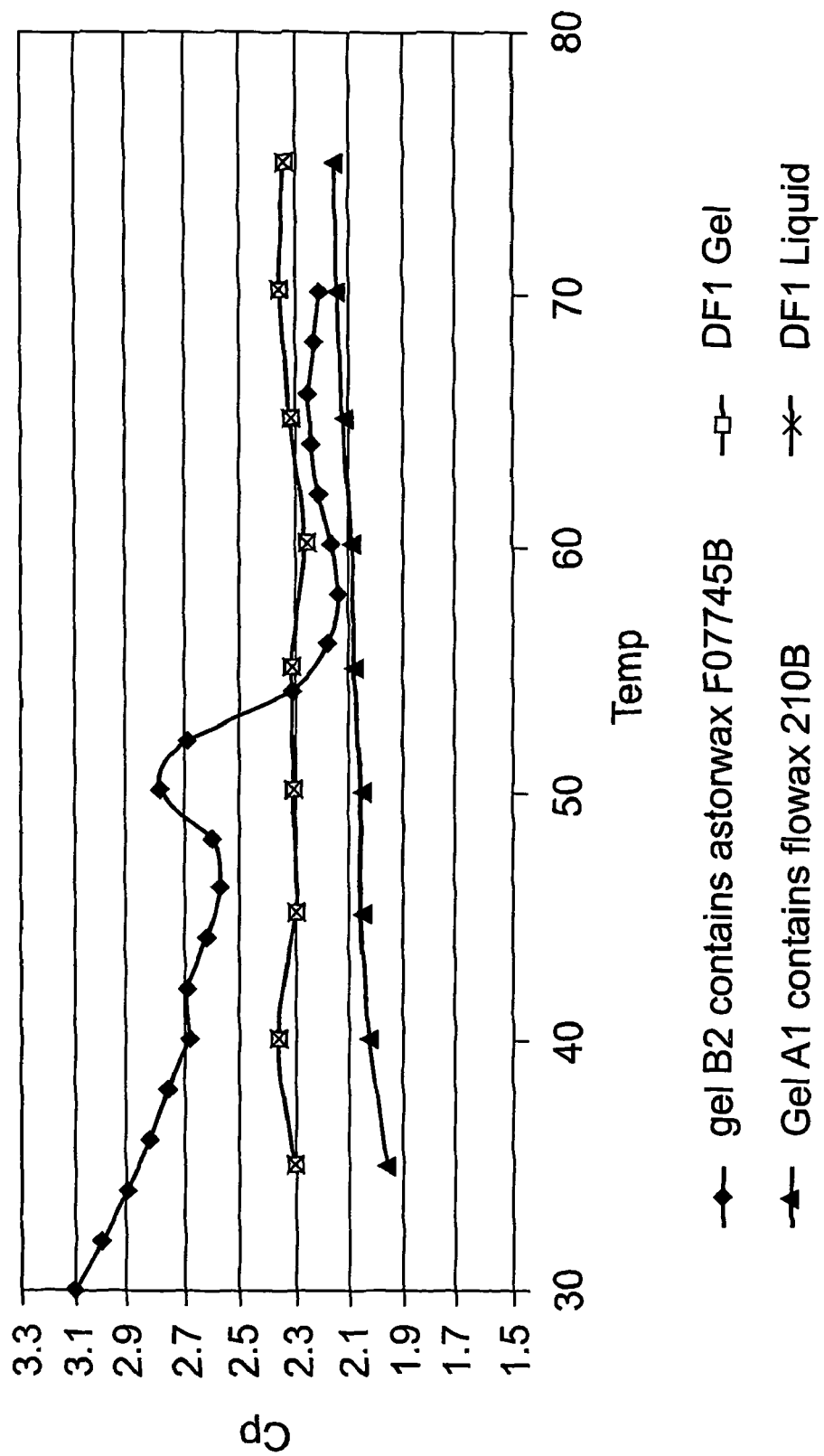

FIG. 4 plots the specific heat capacities for DF1 liquid and DF1 gel and also DF1 gel containing 30 g of two different waxes Flowax 210B—Gel A1 and Astorwax F07745B Gel B2.

The process of forming a gel with DF1 base oil has no effect on the Cp values.

Adding wax can however have a remarkable effect in particular with the Astorwax F07745B which is a high temperature branched chain wax with a melting around 70° C. Here a phase transition is measured at approximately 52° C. after which Cp values continue to climb. The phase change point is shifted and Cp levels continue to climb well above the levels found for DF1 gel on its own. Not all waxes work as well—Gel A1 containing Flowax 210B has a much different Cp profile with specific heat levels lower than the DF1 gel—this wax has a lower melting point than the Astorwax F07745 and it may be that a phase change has not occurred.

These two waxes tested have very different structures. The Flowax 210B has a linear conformation whereas the Astorwax F7745B is a blended highly branched chain material. Thus highly branched chain material are preferred.

Adding wax has two significant benefits:

It raises the Cp value significantly and at lower temperatures the phase change of the wax precipitating out to wax crystallites provides a secondary mechanism to prevent convection to support the gel structure.

The Cp behaviour with the F7745B is particularly significant since it appears to "recruit" the base oil hydrocarbon into the gelling process, rather than act solely as a phase change material.

A further advantage of certain embodiments of the present invention is the high thermal mass and low diffusivity of the gel which increases cool-down times and gives operational flexibility for long tie-backs and remote deep water production systems.

A further benefit of certain embodiments of the present invention is that the thermal performance of the gels, including conductivity and heat capacity, can be varied and thus suitably tailored for individual systems by varying the relative components of oil, water and cenospheres. Thus different compositions of the gels are used depending on the specific nature of the fluids being transported, the pipeline arrangement, the subsea environment and other factors.

For instance, examples 3 and 6 have a high specific heat capacity making them suitable for applications where a long cool down performance is required. Example 2 and 8 by contrast have a much lower thermal conductivity and so it would be particularly suited to ensure high pipeline fluid arrival temperatures thereby easing fluid processing. Example 7 offers a balance between thermal conductivity and good cool down performance although it has a less favourable environmental profile. Example 4 has a low thermal conductivity but also exhibits very low density and could be used in riser applications or as a deepwater buoyancy system.

Therefore certain embodiments of the present invention can be used solely as a buoyancy aid rather than for insulation. Indeed the density of the gel can be varied between the bottom and the top of a single conduit—the top of the conduit can have a gel with a higher proportion of spheres and therefore lower density than the bottom of the conduit. The riser will therefore automatically right itself when immersed in water.

A further benefit of certain embodiments of the invention is that different formulations of gel can be used in the same pipeline. For instance at the pipeline closest to the subsea wellhead hydrocarbons will be at their highest temperature and so a gel formulation with a low conductivity (such as example 2) is preferred to minimise heat loss. At the other end of the pipeline, fluids are at their coldest and most prone to wax deposition and so the gel formulation with an enhanced specific heat capacity (such as example 3) is preferred to improve the cool down performance and thereby minimise the incidence of wax or hydrate formation.

A further benefit of certain embodiments of the invention is that a gel can be made containing high concentrations of pressure resistant microspheres with the interstices between spheres filled with oil as in example 4. Such a material can be usefully employed as a means of deep water buoyancy.

A further benefit of certain embodiments of the present invention is the low toxicity and generally non-hazardous materials which are used which facilitates handling, transportation and disposal.

Moreover, the cost of certain embodiments of the present invention is less than previous syntactic 'wet' coatings or silica based pipe-in-pipe systems, they can be made on site and do not require expensive storage or mixing facilities and a pressure-rated outer carrier pipe is not required.

The thermal properties can be improved further by selecting materials that undergo a change in phase (such as going from a liquid to a solid) on cooling. This change in phase will result in the release of heat thereby extending the time it takes for the pipeline contents to cool down. Gels can be made with such phase change materials by melting the material to render it in its liquid form and adding additives to this.

Other chemicals such as anti bacterial agents, for example Dow™ Antimicrobial 7287, Avecia Proxel XL2 or Rhodia Tolcide PS50D, or corrosion inhibitors for example imidazoline, amine salts or phosphate esters or oxygen or free radical scavengers such as erthorbic acid or tertiary butyl hydroquinone can also be added to this gelled fluid insulating medium.

Improvements and modifications may be made without departing from the scope of the invention.

The invention claimed is:

1. A method of insulating a subsea structure, the method comprising:
   injecting a substance comprising a hydrocarbon into the subsea structure;
   allowing said substance to form a gel, the formed gel having a dynamic viscosity of more than 1000 Pa·S;
   wherein spheres enclosing hydrocarbon gas are added to the substance.

2. A method of insulating a subsea structure, the method comprising:
   injecting a substance comprising a hydrocarbon into the subsea structure;
   allowing said substance to form a gel, the formed gel having a dynamic viscosity of more than 2000 Pa·S;
   wherein the subsea structure comprises a conduit, said conduit enclosing a second conduit and the method comprises recovering hydrocarbons within the second conduit.

3. A method as claimed in claim 2, wherein the gel is adapted to transfer a portion of the hydrostatic pressure on the first conduit onto the second conduit.

4. A method as claimed in claim 2, wherein the thermal properties of the gel are varied over the length of a conduit or series of conduits.

5. A method as claimed in claim 2, wherein the substance comprises a polymeric compound and a transition metal salt.

6. A method as claimed in claim 5, wherein at least one of the polymeric compound and transition metal salt is encapsulated in wax.

7. A method as claimed in claim 5, wherein the polymeric compound comprises an orthophosphate.

8. A method as claimed in claim 7, wherein the orthophosphate comprises an orthophosphate ester.

9. A method as claimed in claim 8, wherein the orthophosphate ester has the structure according to formula I:

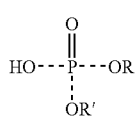

Formula I wherein R is a straight or branched chain alkyl or alkaryl group having about 6 to about 18 carbon atoms and R' is hydrogen or an aryl, alkaryl or alkyl group having about up to 18 carbon atoms.

10. A method as claimed in claim 7, wherein about 0.3% to 3.0 wt % of the phosphate is added to the substance.

11. A method as claimed claim 6, wherein the transition metal salt and polymeric compound are added in an equimolar ratio.

12. A method as claimed in claim 5, wherein the transition metal salt comprises a ferric salt.

13. A method as claimed in claim 12, wherein the ferric salt is selected from the group consisting of ferric sulphate, ferric citrate, ferric ammonium sulphate ferric ammonium citrate, ferric chloride, and ferric gluconate.

14. A method a claimed in claim 2, wherein the conduit comprises further conduits enclosed therein.

15. A method as claimed in claim 2, wherein the formed gel retains its integrity unsupported.

16. A method as claimed in claim 2, wherein the substance is a pourable fluid prior to forming the gel.

17. A method as claimed in claim 2, wherein cenospheres or microspheres are added to the substance.

* * * * *